Sept. 27, 1966  H. NAGEL  3,275,112
REVERSIBLE ONE WAY CLUTCH
Original Filed June 14, 1962  4 Sheets-Sheet 1

INVENTOR.
HERBERT NAGEL
BY
ATTORNEY

INVENTOR.
HERBERT NAGEL

Sept. 27, 1966  H. NAGEL  3,275,112
REVERSIBLE ONE WAY CLUTCH
Original Filed June 14, 1962  4 Sheets-Sheet 4

INVENTOR.
HERBERT NAGEL
BY Gregory S. Dolgorukov
ATTORNEY

United States Patent Office 3,275,112
Patented Sept. 27, 1966

3,275,112
REVERSIBLE ONE WAY CLUTCH
Herbert Nagel, Detroit, Mich., assignor to Wolverine Flexographic Mfg. Co., Detroit, Mich., a corporation of Michigan
Substituted for abandoned application Ser. No. 202,460, June 14, 1962. This application July 6, 1964, Ser. No. 380,334
1 Claim. (Cl. 192—44)

This invention relates to printing and more particularly to the branch thereof called "flexography," and to "flexographic" presses.

The present application is a substitute for my co-pending application Serial No. 202,460, filed on June 14, 1962 for Rotary Printing Press, now abandoned, and has a particular reference to a reversible two-directional driving connection or clutch mechanism used with particular advantages in such presses, although it is not limited to such use.

Flexographic presses are usually presses of the rotary type used for printing in one or more colors on a strip of material usually wound into a roll, which roll is unwound as it passes the press and is wound again after the printing process is completed. Printing plates of such presses are usually made of rubber. Various materials may be printed with the use of such presses, particularly, thin cardboard, paper, and plastic film, either in a single roll layer or in the form of a tube presenting a two layer strip. The strip on which printing is done is termed in the art a "web."

The present invention has particular but not exclusive application to printing a flattened plastic tube such as polyethylene "lay flat sleeve," in which printing often has to be done either on one or on both sides of the running web. Presses of this nature may have as many as six color units and, therefore, may print up to six colors in the same run. If it is necessary to print on both sides of the web, all the colors on one side of the web are usually printed first, and thereupon one or more colors on the other side of the web are printed on a separate run. Obviously such a method ties up the press for twice as long a period of time as is required for printing the web on one side only.

It has been proposed to print both sides of the web during the same run by resetting some of the color units of the press in such a manner that the rubber printing plates inked to print on the other side come in contact with the other side of the web. It can be understood that in such resetting it is necessary to reverse rotation of the roller or cylinder of the color units which are to print on the other side. Such requirement necessitates the provision of means within the driving mechanism to effect such reversal. While such printing has been practiced, its application and efficiency have been greatly reduced by the fact that with flexographic presses used extremely fast drying inks, it is necessary to have its ink rollers run continuously, i.e. without stopping in order to prevent the printing ink drying up on such rollers. After the ink dries on the rollers, which may occur within 2-3 minutes, washing such rollers to remove the dry ink becomes necessary in order to prevent spoilage of considerable amount of material when printing is resumed. It may take as much as 100 feet of printing for the roller to dissolve the dried ink before acceptable printing is reached.

To permit such continuous running of the ink rollers when the web is not running and printing is stopped, means have been provided to disengage the driving connection between the plate carrying cylinder and the ink rollers and to permit the ink rollers to run idle and independently of the other rollers or cylinders as well as other components of the press in order to prevent drying of the ink. Such operation of the ink rollers is made possible by the use of a driving connection mechanism associated with the ink transfer roller, and usually referred to as a "clutch." Such "clutch" mechanism operates to drive the roller in one direction but to run idle in the opposite direction.

In the case of a press having, for example, four color units, should it be desirable to print two colors on one side and two colors on the other side, it would take only a few minutes to rethread the web on the two rollers which are to print on the other side and to reverse the direction of their rotation. However, the great difficulty and serious problems arise because of the necessity to reverse also the clutch mechanism. Such reversing requires removing the ink transfer roller from the press, taking the clutch off the transfer roller shaft, turning it around, remounting it on the shaft, and putting the ink transfer roller with the clutch back in place. This process takes approximately two hours, not only tying up the press for such length of time but producing other serious difficulties.

One of the objects of the present invention is to provide an improved multi-color unit flexographic press, whereby the above difficulties and disadvantages are overcome and largely eliminated, and whereby the press can be selectively set or reset for printing on one or both sides of the web without the necessity of removing the clutch mechanism and partial disassembly of the color unit or removing the ink transfer unit from the machine and separating the clutch for reversal.

Another object of the invention is to provide an improved flexographic press of the foregoing character in which setting or resetting the press for printing on both sides after the press was printing on one side, or for printing all colors on one side after the press was printing on both sides, requires only a few minutes of time, with the limiting factor on resuming printing being not in reversing the clutch means but rethreading the web, with the latter operation presenting little or no difficulties.

A still further object of the invention is to provide an improved driving connection or clutch mechanism adapted to provide a driving connection between two shafts in one direction and to automatically eliminate such connection and permit independent running of the shafts in the opposite direction, with such mechanism being reversible by a very simple adjustment quickly made, and to provide after such adjustment a driving connection in the direction previously permitting free running and free running in the direction of previous driving.

A still further object of the present invention is to provide a clutch mechanism of the above character in which such adjustment can be made merely by rotating for a few degrees a collar provided therein and tightening it in another position, two of such positions being provided in the clutch.

A still further object of the present invention is to provide an improved clutch mechanism of the foregoing character which can be installed in various machines and devices requiring such reversal of operation, with the clutch mechanism having its adjustment means in such arrangement or position that their adjustment and reversing operation of the machine or device can be done safely, easily, and in only one or two minutes of time.

A still further object of the present invention is to provide an improved clutch mechanism of the foregoing character which is compact, simple and rugged in construction, is dependable in operation and relatively inexpensive to manufacture.

Further objects and advantages of this invention will be apparent from the following description and appended claims, reference being had to the accompanying drawings forming a part of this specification, wherein like reference characters designate corresponding parts in the several views.

Figure 7:
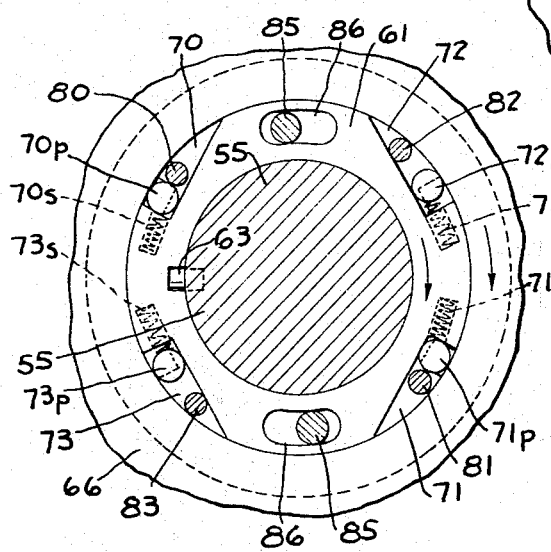
FIG. 7 is an end view, partly in section, taken in the direction of the arrows on the plane passed through line 7—7 of FIG. 5, with the pins of one set wedged in their respective recesses to drive the unit in the direction indicated in said figure by an arrow, while the pins of the other set are restrained by the fingers of the reversing cage member from wedging into their respective recesses.
Figure 8:
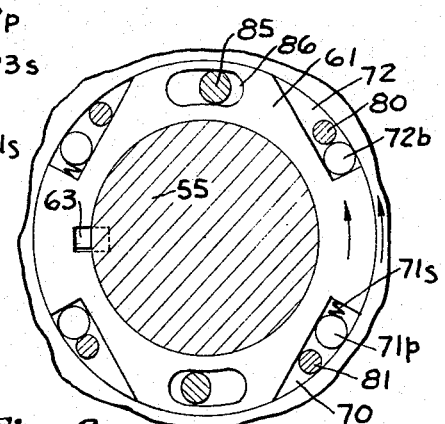

FIG. 8 is a view similar in part to FIG. 7 but showing the adjusting collar of the reversing member moved to another position to reverse operation of the clutch by moving the fingers thereof to force the pins previously wedged in from such wedged-in position to their idling positions, and to release the pins previously held in their idling positions for wedging in and driving the unit in the opposite direction, i.e. in the direction as indicated by the arrow in FIG. 8.

Figure 9:
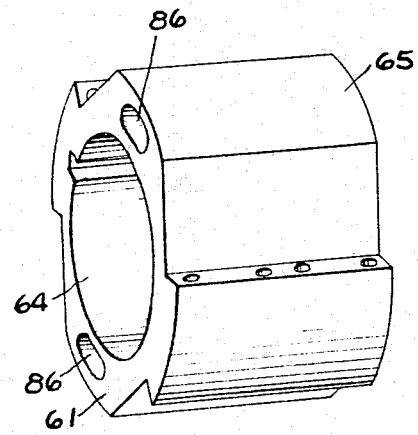

FIG. 9 is a perspective view illustrating the inner rotatable member separately.

Figure 10:
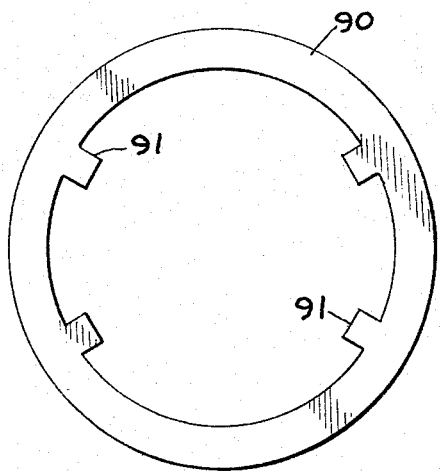

FIG. 10 is an end view illustrating the free wheeling spacer.

Figure 11:
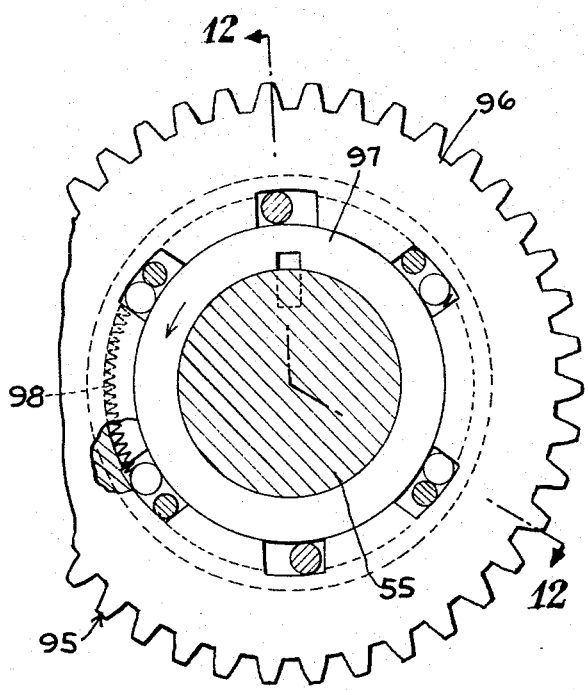

FIG. 11 is a view similar in part to FIG. 7 but showing a modified construction in which wedge recesses are provided in the outer rotatable member, rather than in the inner rotatable member as in the construction of FIGS. 5–10.

Figure 12:
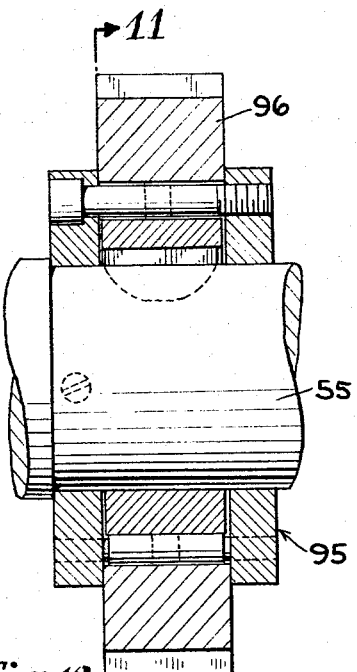

FIG. 12 is a sectional view taken in the direction of the arrows on the section plane passed through the broken line 12—12 of FIG. 11.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not of limitation.

Figure 1:
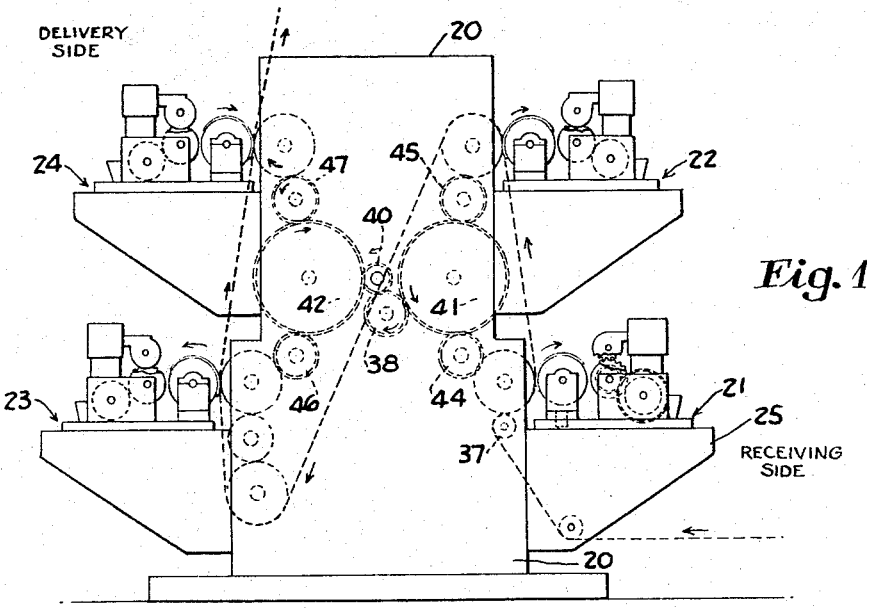
FIG. 1 is an elevational side view of the flexographic press embodying the present invention, showing in a diagrammatic manner the press including four color units, with the web in position for printing two colors on each side thereof.
Figure 2:
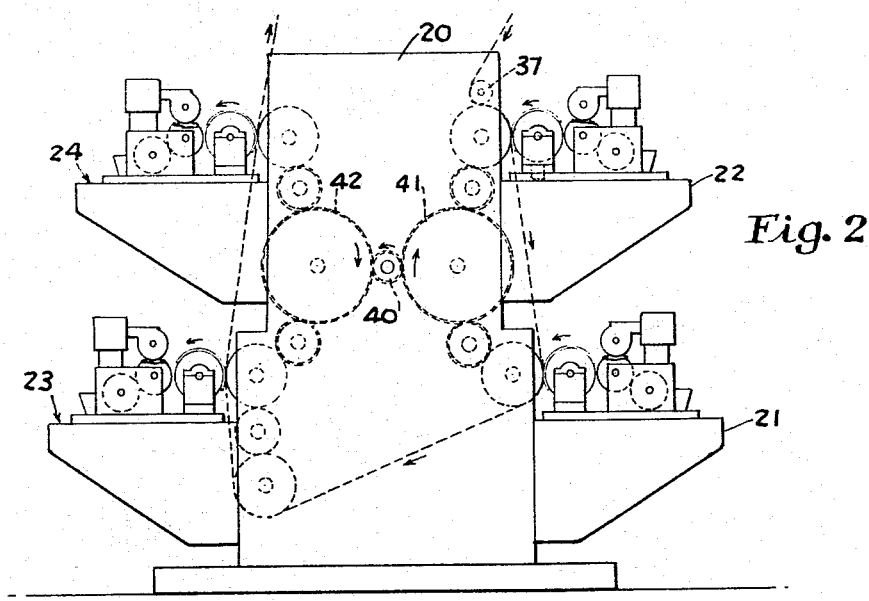
FIG. 2 is a view similar in part of FIG. 1 but showing the web rethreaded to have the two units appearing on the righthand side in said figures printing on the same side of the web as the units on the lefthand side, thus having all four units of the press printing on the same side.

In the drawings there is shown, by way of example, a flexographic printing press embodying the present invention. Referring specifically to FIGS. 1 and 2, the press illustrated therein comprises a frame 20 having four color units generally designated by the numerals 21, 22, 23, and 24, operatively mounted on said frame 20 on brackets, such as bracket 25 of the unit 21.

The frame 20 of the press is so constructed that it can receive any practical number of brackets such as the bracket 25 for mounting color units thereon, such as one, two, three, or four. Furthermore, the frame 20 is adapted to receive at its top an extension (not shown) on which, in turn, two additional color units may be mounted. Although six color units so produced represent constructions in which the present invention is still more advantageous, and which are manufactured in substantial proportion as compared with presses having a smaller number of color units, only a four color unit press is illustrated herein for the sake of simplicity. It will also be understood that a user of the press may purchase the same with a standard frame such as 20 but only one or two color units, and then add unit by unit as his operations may require. By such a construction the necessity of scrapping or otherwise disposing of a single color unit press when a two unit press is required, or disposing of a two color unit press when a four color unit press is acquired, and so on, is eliminated.

It shall be understood that the present invention is not limited to multiple color unit presses but is applicable with equal success to a single unit press since it often becomes necessary to reverse operation of such a single unit.

Figure 3:
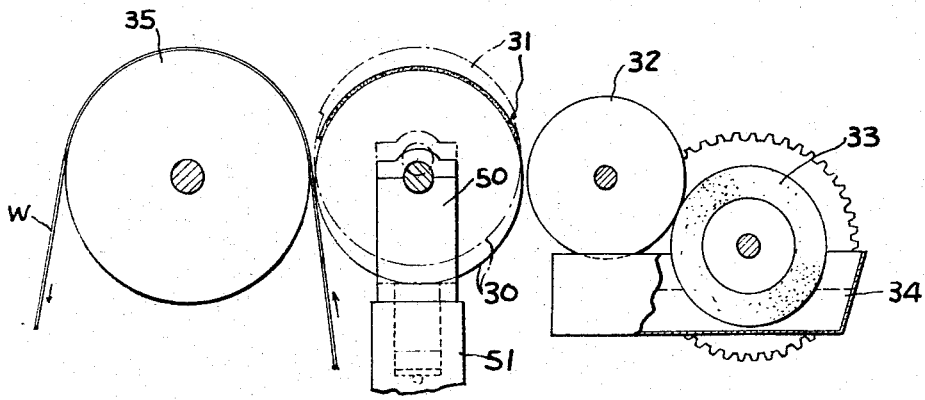
FIG. 3 is a diagrammatic elevational view illustrating the arrangement of the cylinders of one color unit.

Referring to FIG. 3, each color unit comprises a plate cylinder 30 carrying a printing plate 31 which is usually made of rubber or a suitable rubber-like material and cemented on the plate cylinder 30. The thickness of rubber plates is standardized, presently ⅛", for the reasons which will become apparent later. An ink transfer cylinder 32 is mounted adjacent the plate cylinder 30 to transfer ink in proper and even film on the rubber plate 31. The ink transferring cylinder 32 has its cylindrical working surface engraved by the use of a photo-engraving process to provide a large number of small ink-retaining indentations thereon, such as 160–180 indentations per square inch. The cylinder 32 receives ink from the lower ink cylinder 33 running in an ink well 34. An impression cylinder 35 is mounted on the other side of the plate cylinder 30 in a fixed position. The web W is threaded over the impression cylinder 35 which provides support for the web W pressed upon by the rubber plate with the desired pressure attained with the aid of adjusting means in the cylinder 30, whereby the rubber plate 31 exerts stronger or lighter pressure on the web.

The plate cylinder 30, the impression cylinder 35, and the ink transfer cylinder 32 have in operation the same or equal peripheral speeds in order to produce frictionless rolling between the cylinder surfaces, and to eliminate rubbing and smearing of the fresh imprints. This is attained by their driving gears, mounted on the shafts of their respective cylinders, having their respective pitch diameters equal to the respective diameters of their cylindrical surfaces. In other words, the pitch diameter of the gear 35g is the same as the diameter of the cylinder 35, the pitch diameter of the gear 30g is the same as the diameter of the plate cylinder 30 plus double thickness of the rubber plate 31, and the pitch diameter of the gear 32g is the diameter of the engraved cylindrical surface of the ink transfer cylinder 32. On the other hand, it is desired that there be certain rubbing or wiping action between the photo-engraved surface of the cylinder 32 and the surface of the ink cylinder 33. Accordingly, the gear 33g is considerably larger than the pinion 32, thus insuring that the ink transferring cylinder 32 rotates much faster than the ink cylinder 33; and, therefore, in spite of its having approximately the same diameter as the ink cylinder 33, the surface of the ink transferring cylinder 32 overruns the surface of the lower ink cylinder 33.

A pinch roller, such as indicated at 37, cooperates with the impression cylinder of the unit which is the first to receive the web from the supply roll, such as the unit 21 in FIG. 1. In FIG. 2, such roller 37 is arranged in the unit 22. The purpose of the pinch roller is to provide proper grip and tension on the web in unwinding it from the supply roll.

Figure 4:
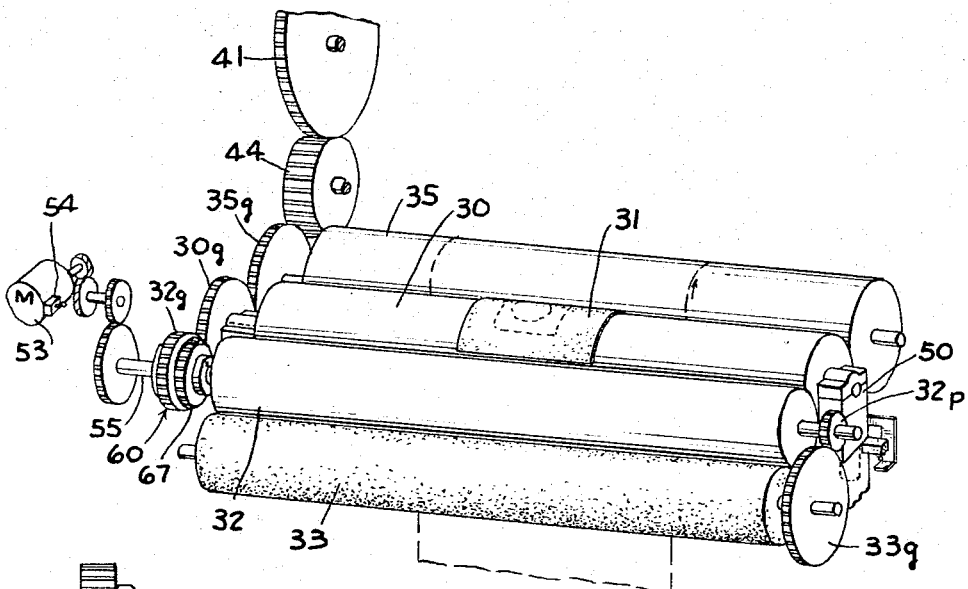
FIG. 4 is a diagrammatic perspective view showing the cylinders of one color unit and the driving means therefor.
Figure 1A:
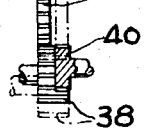
FIG. 1a is a diagrammatic view supplementing showing of the arrangement of gears for reversing color units on the righthand side (as appearing in FIG. 1) of the press.

All of the color units of the press are driven from the central drive gear 40 and large intermediate driving gears 41 and 42. The gear 41 meshes with the idler gear 44 driving the color unit 21, and with the idler gear 45 driving the color unit 22. The intermediate gear 42 meshes with the idler gear 46 driving the color unit 23 and with the idler gear 47 driving the color unit 24. The gear 41 has single width. To reverse the color units 21 and 22 the gear 41 may be moved axially inwardly of the press to clear the main driving gear 40 also having single width, but to remain in mesh with gears 44 and 45 which have double width. To provide driving connection with the main driving gear 40 in such condition, a double width gear 38 mounted on an eccentric is brought into mesh with the gear 40 and 41, as shown in FIG. 1a. Presuming that FIG. 4 illustrates the color unit 21, the idler gear thereof is accordingly designated by the numeral 44 and the intermediate gear by the numeral 41.

In FIG. 2 the central or main driving gear 40 is shown in direct mesh with the intermediate large gears 41 and 42 causing the same to be driven in the same direction as indicated (clockwise in FIG. 2). Such driving is necessary when all four color units print on the same side. On the other hand, when it becomes necessary to reverse the units 21 and 22, the gear 41 is taken out of direct mesh with the gear 40 and connected therewith through the idler gear 38, as mentioned, reversing rotation of the gear 41, i.e. causing it to rotate counter-clockwise as indicated in FIG. 1 and thus reversing the direction of operation of the color units 21 and 22.

For the sake of clarity of the drawings, the gear 40 is shown in FIG. 1 at a distance from the intermediate gear 41 to make it clear that there is no direct meshing between the gear 40 and the gear 41 in the operation of the color units illustrated in said FIG. 1. On the other hand, in FIG. 2 the gear 40 is shown in direct contact with both gears 41 and 42.

It will be understood from examination of FIGS. 1 and 2 that when it becomes necessary to cause a color unit to print on the opposite side from the side which it was printing before, it is necessary not only to reverse operation of the unit but also to rethread the web through the unit in such a manner that it would be moving in the direction opposite to that in which it was previously moved, such as down in units 21 and 22 in FIG. 2 instead of up as in FIG. 1.

Reversing the direction of operation of the units and rethreading the web do not present a particularly difficult or time-consuming problem. These operations can be performed within a period from 10 to 20 minutes and, therefore, they do not tie up the press for any substantial period of time. The main difficulty results from the necessity of disconnecting the transfer cylinder 32 from the plate cylinder 30 in order to continue rotation of the lower ink cylinder 33 and the ink transferring cylinder 32 while the plate cylinder 30 is at rest. Such disconnecting, which has to be done without losing the registry between the cylinders, is effected by raising the plate cylinder 30 together with its bearings 50, preferably with the aid of hydraulic means (not shown) by causing the lower portion of the bearings 50 to move in the slide 51. The cylinder 30 is raised only for such a distance as to cause it to lose contact with the adjacent cylinders but with its gear 30g remaining in half mesh with the gears 32g and 35g. If the meshing of these gears is not lost, moving the plate cylinder 30 down will return these gears in full mesh and into prior registry.

When the cylinder 30 is raised, the ink transfer cylinder 32 and the lower ink cylinder 33 are rotated independently of the plate cylinder from the electric motor 53 through a train of gears. The motor 53 is provided with a reversing switch 54 in order to cause rotation of the cylinders 32 and 33 in the desired direction. Since under such conditions, the gear 32g, which is a part of the clutch mechanism generally indicated by the numeral 60 described in detail below, is in mesh with the gear 30g of the plate cylinder 30 which is stationary, the shaft 55 on which the cylinder 32 is mounted must idle with the clutch mechanism 60.

The direction of idling rotation of the ink transferring cylinder 32 is determined by the direction in which the plate cylinder 30 was rotating prior to its raising. However, when the rotation of the cylinder 30 is reversed for the purposes explained above, it becomes necessary to reverse also operation of the clutch mechanism 60 in order that the same will drive in the opposite direction and permit free running in the direction opposite to the direction in which idling was taking place before.

In prior presses such reversing of the clutch required removal of the entire ink transfer cylinder such as 32, which is a heavy unit, removing the motor such as 53 with its gears, removing the clutch 60 from the shaft 55, disassembling it for reversing, reassembling it to reverse position of some of its components, and remounting the entire clutch on said shaft. Such operation in addition to inviting a number of serious difficulties explained above, such as subjecting the delicate surface of the cylinder 32 to the danger of irreparable damage, also requires approximately two hours of time for its completion, tying up the press for a considerable portion of the working day, and requiring the service of additional personnel of critical skill, which personnel may not be available at the printing plant and which must come from the outside.

In accordance with the invention construction of the clutch mechanism 60 is such that its reversal can be made in a matter of two or three minutes by the press operator and merely by loosening a set screw of the reversing member moving its adjusting color to a new position and tightening it therein, all without otherwise disturbing the clutch or the press.

The clutch mechanism 60 is constructed in accordance with the present invention to operate in two settings. Using the words "clockwise" and "counter-clockwise" for the purposes of description, the function of the clutch mechanism may be stated in the following manner. In one setting the clutch mechanism provides driving in the clockwise direction and free running in the counter-clockwise direction. In the other setting, the clutch mechanism provides driving in the counter-clockwise direction and free running in the clockwise direction.

Generally, the clutch mechanism 60 comprises two rotatable coaxially arranged members free to rotate one with respect to the other. Automatic means are provided adapted to lock these members for driving and to unlock them for free running. Since one such member is preferably arranged inside of the other, such members may be termed an outer rotatable member and an inner rotatable member. The inner rotatable member is usually secured on a shaft. If the outer rotatable member is driven by some extraneous means for the purpose of driving the shaft on which the inner rotatable member is mounted, locking or unlocking the rotatable members which cause driving the shaft or permit said shaft to run independently of the outer driving member.

Referring specifically to FIGS. 5–10, the clutch mechanism illustrated therein comprises an inner rotatable member 61 mounted on a shaft 55 and suitably secured thereto for rotation therewith, such as with the aid of slots-and-key means as indicated at 63. The inner rotatable member 61 is of a hollow cylindrical shape as is best shown in FIG. 9. Into the cylindrical hollow 64 of the inner member 61 is fitted the shaft 55 of the ink transferring cylinder 32, while over the outer cylindrical surface 65 of the inner member 61 is fitted the outer rotatable member 66. On the periphery of the member 66 there is provided a plurality of gear teeth to form a gear 32g as mentioned above for the purpose of driving connection with gear 30g of the plate cylinder 30.

In the embodiment of the invention illustrated in FIGS. 5–10, the outer rotatable member is of an articulated construction and includes the second outer rotatable member 67 having gear teeth 68 provided around its periphery. The member 67 is of a different diameter than the member 66, thus providing, in effect, a second gear also operable by the inner member 61. It will be understood, however, that the addition of the second gear portion in the clutch mechanism 60 is for the purpose of the press disclosed herein and that only one or more than two gear portions for purposes of other devices utilizing my improved clutch may be provided.

In the outer cylindrical surface 65 of the inner member 61 there are provided two sets of recesses, with the recesses of each set converging in the same direction but opposite to the direction in which all of the recesses of the other set converge. Referring particularly to FIGS. 7–9 recesses 70 and 71 converge or point in clockwise direction, while the recesses 72 and 73 converge or point in counter-clockwise direction. In the recesses 70 and 71 there are provided driving pins 70p and 71p, while driving pins 72p and 73p are provided in recesses 72 and 73, respectively. Compression springs 70s, 71s, 72s and 73s housed in the cylindrical recesses provided in the end walls of the respective wedge recesses operate to force their respective pins 70, 71, 72, and 73 to roll and wedge in the converging recess, thereby locking the inner member 61 to the outer member 66 for rotation.

A reversing cage member includes front plate 77 and back plate 78 and two sets of fingers inbetween. One set comprises fingers 80 and 81 and the other set fingers 82 and 83. The cage member is arranged to have said fingers pass through the wedging recesses, as illustrated. The cage member together with its plates 77 and 78 is free to rotate on the shaft 55 with respect to the inner member 61 as much as is permitted by the screws 85 passing through the elongated recesses 86 provided in the inner member 61. By tightening the screws 85, the cage member together with its fingers is fixed with respect to the inner member 61 in either of the two extreme positions, with the screws 85 being at one of the two ends of the recess 86. The fingers 80 and 81 are so offset with respect to fingers 82 and 83 that when the fingers 80 and 81 bear on the pins 70p and 71p, pressing them in opposition to the springs 70s and 71s toward the back walls of the recesses 70 and 71 they prevent the pins 70p and 71p from wedging into said recesses and providing driving connection in the clockwise direction (see FIG. 7). At the same time, the fingers 82 and 83 are disposed away from the pins 72p and 73p permitting said pins to run and to wedge into their recesses 72 and 73 to provide a driving connection between the members 66 and 61 for driving the member 61 and the shaft 55 in the clockwise direction. On the other hand, when the cage member is moved into the position illustrated in FIG. 8, the fingers 80 move forward toward the converging ends of the recesses 70 and 71 permitting the pins 70p and 71p, previously restrained, to run forward in their recesses and to form a driving connection between the members 66 and 61 to drive the member 61 and the shaft 55 in the counter-clockwise direction as shown in FIG. 8. At the same time, fingers 82 and 83 force the pins 72p and 73p toward the back walls of their recesses 72 and 73, in opposition to springs 72s and 73s, making them ineffective and destroying the driving connection which they previously provided between the members 66 and 61 in the clockwise direction.

Figure 5:
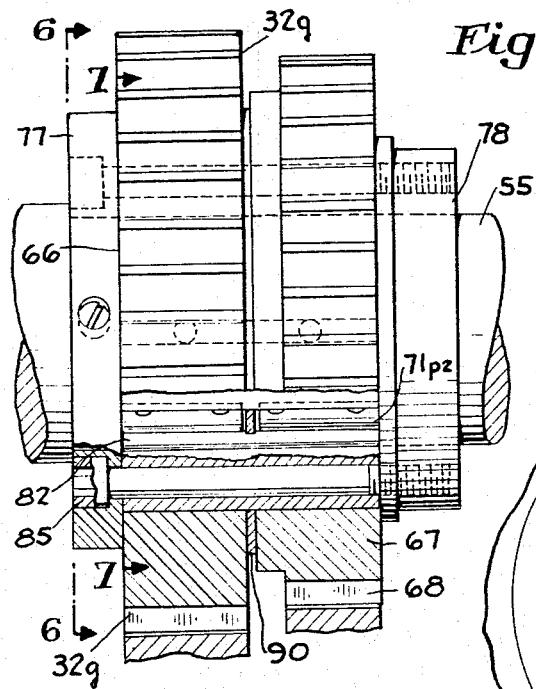
FIG. 5 is a front view partly in section of the two-way reversible clutch interposed in each color unit between the plate cylinder and the ink transferring cylinder thereof.
Figure 6:
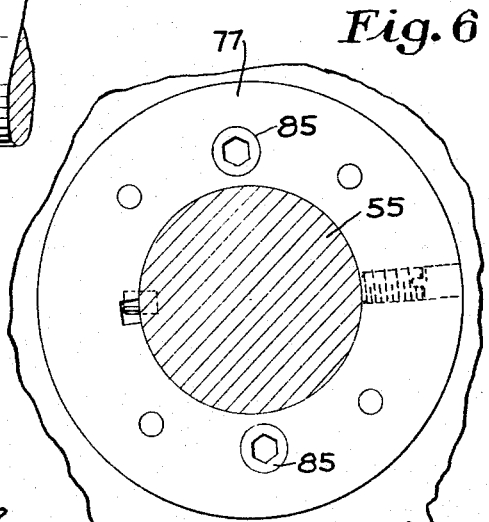
FIG. 6 is an end view, partly in section, taken in the direction of the arrows on the section plane passed through the line 6—6 of FIG. 5

Since the clutch mechanism 60 illustrated in FIGS. 5–10 includes two outer members 66 and 67 both operable from the single inner member 61, but for different purposes, each of the recesses of the inner member 61 is provided with two driving pins placed coaxially end to end as is best shown in FIG. 5 wherein one such additional pin is designated by the numeral $71_{p2}$. In order to provide a balanced construction, each pin is urged in the wedging direction by two springs. Thus, there are four springs in each recess. A separating collar 90 disposed between the outer members 66 and 67 is provided in order to prevent direct contact between said outer members. Lugs 91 projecting radially toward the center of the separating collar 90 engage the fingers of the cage member and, therefore, cause said separating collar 90 to rotate with the inner driving member 61.

The clutch member illustrated in FIGS. 11 and 12 and generally designated by the numeral 95 is of a modified construction. An important difference in the construction of members 60 and 95 is in the provision of wedge recesses in member 95 in the outer driving member rather than in the inner driving member, and in having only a single outer driving member 96. The inner member 97 has unbroken outer cylindrical surface and is keyed to the shaft 55. Operation of the driving pins and cage member as well as of the cage member adjusting means is similar to that of the construction of FIGS. 5–10. However, for the sake of simplicity two springs urging the driving pins in opposite directions, such as springs 70s and 73s of the construction of FIGS. 5–10, have been replaced in the construction of FIGS. 11 and 12 by a single spring 98 disposed in a groove formed in the outer member 96.

It will now be seen in view of the foregoing that for the purposes of reversing operation of the clutch member such as 60 or 95 it is only necessary to loosen its set screw and move the cage through a small angle determined by the recesses such as 86 and tightening the cage member in a new position. After such an adjustment the clutch member will drive and afford free running in the directions opposite to those in which it operated prior to the adjustment.

By virtue of the above disclosed constructions the objects of the present invention listed above and numerous additional advantages are attained.

I claim:

In a clutch mechanism, a rotatable outer member having a central cylindrical recess and a rotatable inner member operatively arranged within said recess to have its outer surface adjacent the inner cylindrical walls of the cylindrical recess, said inner member being provided in its outer surface with an even plurality of wedge recesses, one-half of said recesses pointing in one direction with respect to member rotation and the other half in the opposite direction, a corresponding plurality of driving pins operatively arranged in said recesses, said pins having diameter smaller than the greatest depth of said recesses, a reversing member associated with said inner member and having a corresponding plurality of fingers projecting into said recesses in front of said driving pins in such positions that in one position of the reversing member the driving pins in one half of the recesses are free to move into their respective wedging-in positions between the inner and the outer member for drivingly connecting the same while the driving pins of the other half of the recesses are held by their respective fingers back at their respective idling positions, with said reversing member being adapted to be moved and fixed in another position relative to the inner member, at which position the fingers that previously held half of the pins in their respective idling positions move to allow said pins to wedge in for driving in the opposite direction while the remaining fingers move their respective pins in the idling position, the reversing member comprising a pair of annular plates mounted adjacent the ends of the inner members, screws spaced from said fingers and extending through axially extending passages in the inner member, the diameter of each passage being greater than the diameter of each screw in a circumferential direction relative to the axis of the clutch mechanism, said screws secured to said plates so as to maintain said plates in engagement with opposite ends of said inner member, and said fingers extending between and secured to said plates.

References Cited by the Examiner

UNITED STATES PATENTS

| | | | |
|---|---|---|---|
| 247,669 | 9/1881 | Mallet et al. | |
| 275,388 | 4/1883 | Huyck | 192—44 |
| 1,136,821 | 4/1915 | Loomis | 192—44 |
| 2,435,791 | 2/1948 | Luehrs | 101—180 |
| 2,844,095 | 7/1958 | Harless | 101—180 |
| 2,865,228 | 12/1958 | Weismann | 192—44 X |

FOREIGN PATENTS 13,316   6/1899   Great Britain.

DAVID J. WILLIAMOWSKY, *Primary Examiner.*

ROBERT E, PULFREY, BENJAMIN W. WYCHE III, J. R. FISHER, *Assistant Examiners.*